F. M. AND W. L. B. CUSHING.
ELECTRIC SPOT WELDING MACHINE.
APPLICATION FILED APR. 7, 1920.

1,435,812.

Patented Nov. 14, 1922.
3 SHEETS—SHEET 3.

Inventors
William L. B. Cushing
Frank M. Cushing
By Franklin H. Hough
Attorney

Patented Nov. 14, 1922.

1,435,812

UNITED STATES PATENT OFFICE.

FRANK M. CUSHING AND WILLIAM L. B. CUSHING, OF LOS ANGELES, CALIFORNIA.

ELECTRIC SPOT-WELDING MACHINE.

Application filed April 7, 1920. Serial No. 371,998.

*To all whom it may concern:*

Be it known that we, FRANK M. CUSHING and WILLIAM L. B. CUSHING, citizens of the United States, residing at Los Angeles, in the county of Los Angeles and State of California, have invented certain new and useful Improvements in Electric Spot-Welding Machines; and we do hereby declare the following to be a full, clear, and exact description of the invention such as will enable others, skilled in the art to which it appertains to make and use the same, reference being had to the accompanying drawings, and to the letters and figures of reference marked thereon, which form a part of this specification.

The object of this invention is to provide a novel construction of spot welding machine, embodying a thermo-syphonic system of cooling the electrodes and preventing radiation of heat.

The accompanying drawings clearly disclose our preferred form of construction, in which.

Figure 1:
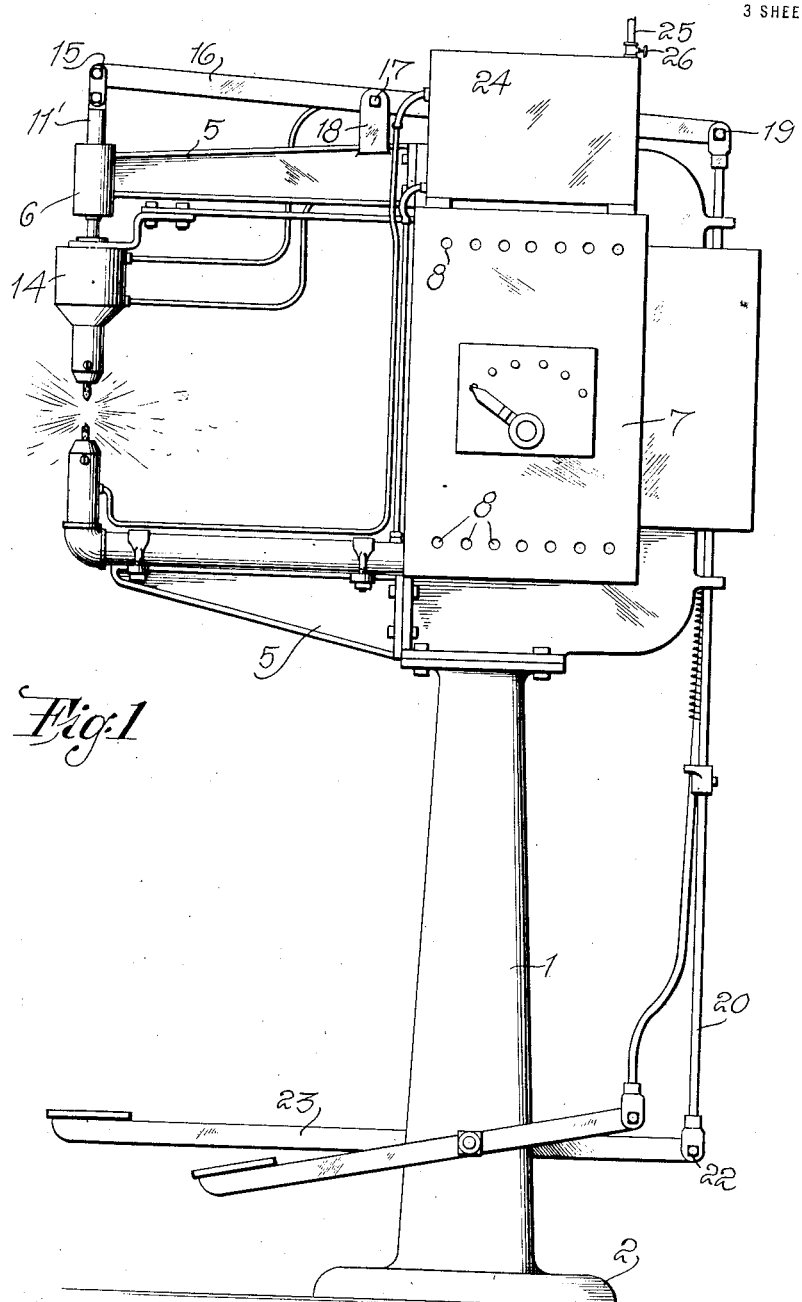
Figure 1 is a view in side elevation of a spot welding machine embodying our improvements.

Referring now in detail to the drawings:

1 designates a suitable supporting standard, or pedestal, having a base 2.

The pedestal 1 supports at its top a U-shaped casting 3, to the ends of which are suitably secured, as by means of rivets 4, horizontal arms 5, 5, the upper arm 5 carrying a tubular bearing 6.

The casting 3 supports a boxing 7, provided with numerous apertures 8 in the wall thereof.

Disposed interiorly of the boxing 7 is an electric coil 9, electrically connected by means of the electric conducting rods 10, 10 with electrode holders 11 and 11'. The electrode holders 11 and 11' carry the electrodes 12, 12, the electrode carried by the plunger 11' being the positive electrode and the electrode carried by the elongated holder 11 being the negative electrode. The electrode holder 11 is disposed concentrically within a pipe 13, and the electrode holder 11' reciprocates through a hollow shell 14.

The plunger, or the electrode holder 11' is slidably supported in the bearing 6, and is pivotally secured at its upper end, as shown at 15, to a lever 16, fulcrumed at 17 on a bracket 18, carried by the upper arm 5. The lever 16 is pivotally secured at one end, as shown at 19, to an operating rod 20, guided in ears 21, 21, projecting from the casting 3. The vertical rod 20 is pivotally secured at its lower end, as shown at 22, to one end of a foot lever 23, fulcrumed to the pedestal 1, whereby, by pressing downward upon the foot lever 23, the operating rod 20 will be projected upward, thereby rocking the lever 16 to reciprocate the electrode holder 11' downward, so that the electrode 12, carried thereby, is moved toward the opposite electrode, in a well known manner.

Supported upon the top of the boxing 7 are water tanks 24, 24, each provided with a suitable means for supplying water thereto, such as a pipe 25, passage through which is controlled by a valve 26.

Each tank has pipe connections with one of the water jackets 13 and 14. As shown in the drawings, one of the tanks 24 communicates by a pipe 27 tapped into the lower portion of said tank, with one end of the water jacket 13, being the end thereof opposite the end supporting the electrode 12. Tapped into said tank 24, toward its upper end, is a second pipe 28, communicating with the water jacket 13, toward the electrode end thereof. The other tank 24 likewise communicates by a pipe 29, tapped into the lower portion of said tank, with the water jacket 14 at a point preferably intermediate the length thereof, and a second pipe 30 is tapped into said tank 24 toward the upper end thereof, and communicates at its other end with the water jacket 14 at the upper end thereof, as shown.

Figure 2:
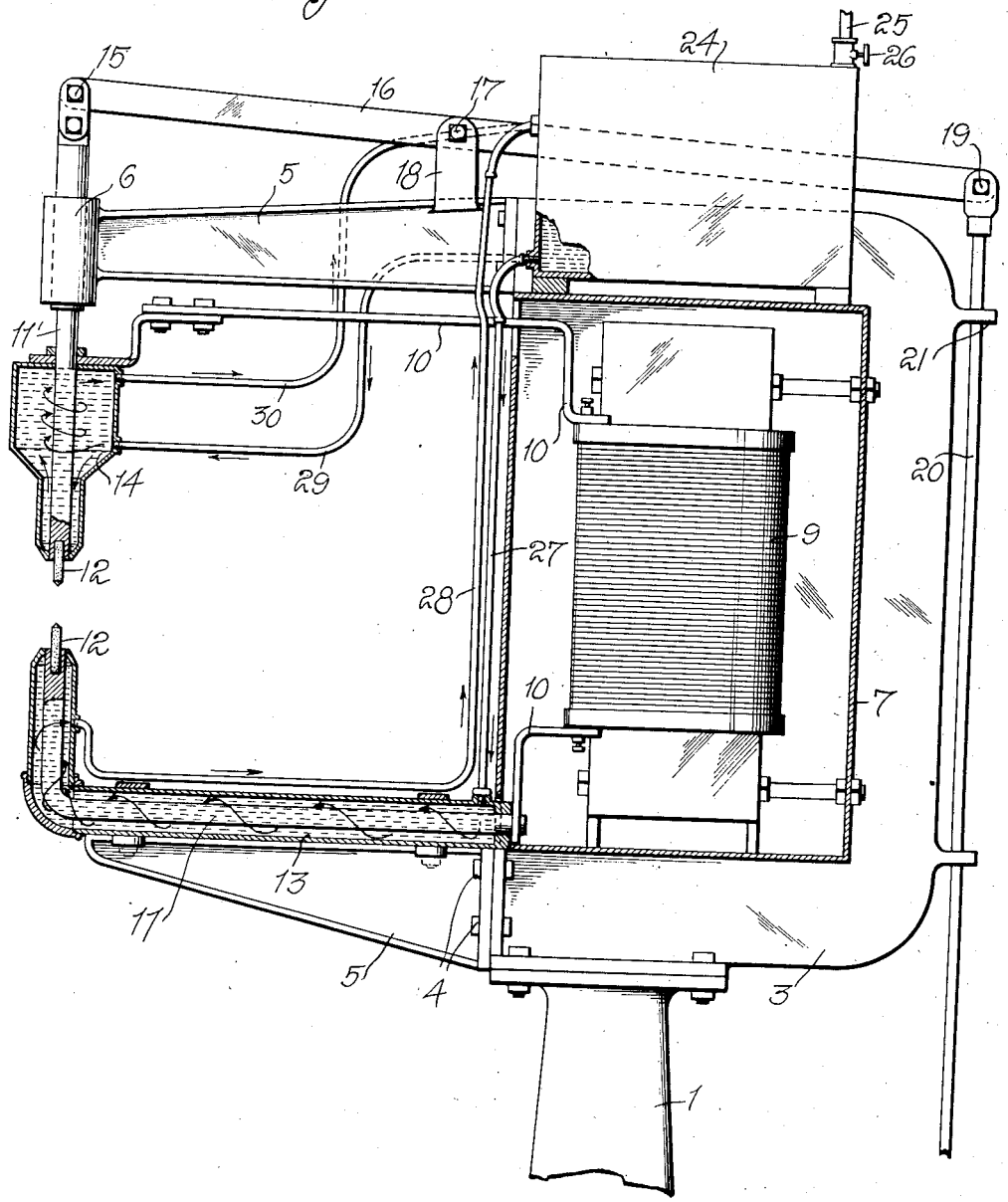
Figure 2 is a similar view, partly in section.
Figure 3:
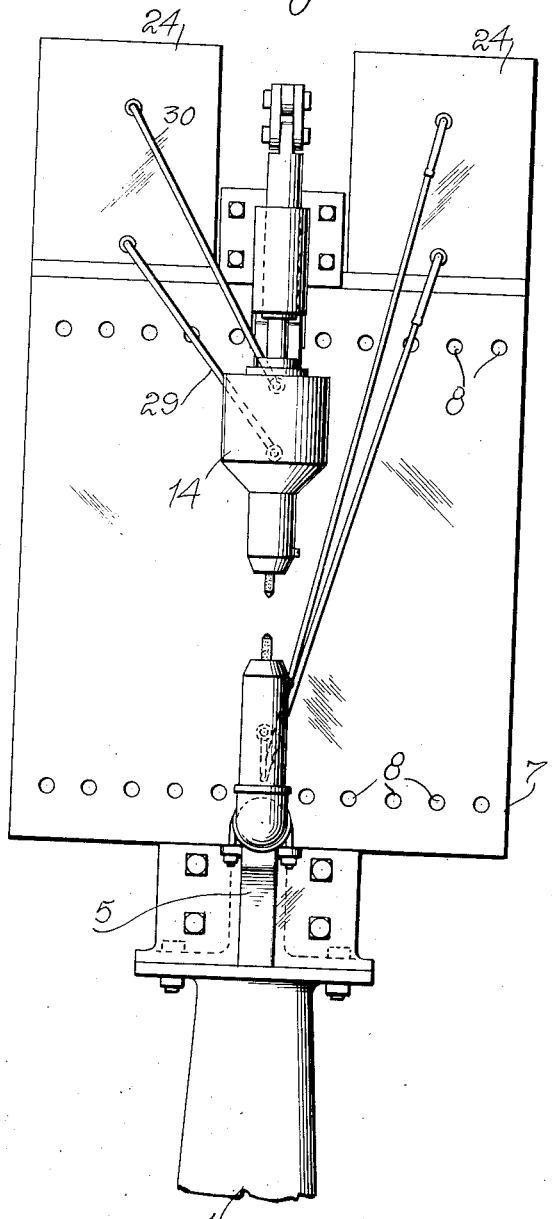
Figure 3 is a view in front elevation, the supporting standard, or pedestal, being shown broken away.

The water in the water jackets becomes highly heated in the region of the electrodes, causing the water to be converted into steam and to pass through the pipes 28 and 30, as shown by the arrows in Figure 2, to the top of the tanks 24, causing circulation of water through the pipes 27 and 29 into the water jackets 13 and 14.

Figure 4:
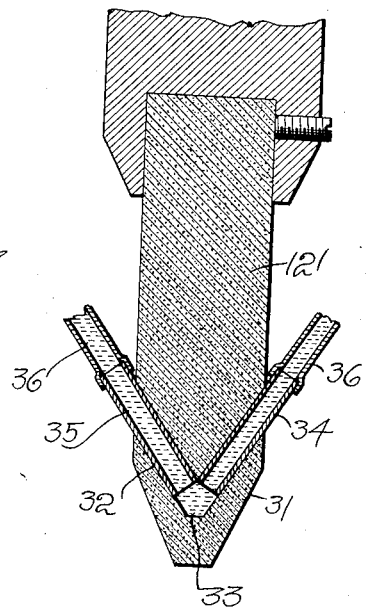
Figure 4 is a fragmentary sectional detail view of a modification.

Figure 4 shows a slight modification in which an electrode 12' is provided with two convergently inclined openings 31 and 32, said openings merging at the end thereof centrally of the width of the electrode, as shown at 33. Tapped into said openings 31 and 32 are pipe sections 34 and 35. Connected with each of said pipe sections 34 and 35, at its outer end is a preferably flexible tubing 36, it being understood that one of said tubes 36 communicates with a water tank at the bottom thereof and the other of said tubes 36 with said tank at the top thereof in the manner of the pipes 27 and 28, or 29 and 30, of the device of the preceding figures of the drawings. The operation of this form of our invention is substantially the same as that of the preceding figures, the water flowing through the point of the electrode, which circulation is caused by the heating of said point at the time of welding, the circulation being thermo-syphonic.

It will thus be noted that by our construction, we have provided an electric welder, embodying a thermo-syphonic system of cooling, eliminating the use of forced feed circulation, or city water pressure, as a means of circulation.

What we claim to be new is:

1. A spot welding apparatus comprising a frame, chambers carried upon the frame and having offset portions extending into juxtaposition, means to produce a circulation of a cooling medium within the chambers, electrode holders passing through the chambers in contact with the cooling medium, and electrodes carried by the holders at points adjacent the offsets of the chambers.

2. A spot welding apparatus comprising a frame, chambers mounted upon the frame and having offsets extending into juxtaposition, means to maintain a circulation of a cooling medium within the chambers, electrode holders extending through the chambers in contact with the cooling medium, means to move one of the electrode holders within the chamber, and means externally of the offsets of the chambers for holding electrodes in engagement with the electrode holders.

3. A spot welding apparatus comprising a frame, chambers mounted upon the frame and having offsets extending into juxtaposition, means to maintain a circulation of cooling medium within the chambers, electrode holders extending within the chambers, means to reciprocate one of the electrode holders within one of the chambers, electrodes carried by the electric holders positioned adjacent the offsets of the chambers, and means to make electrical connection with the electrode holders.

4. A spot welding device comprising a frame, arms extending outwardly from the frame, chambers carried at the extremities of the arms and having offsets extending toward each other, electrode holders disposed within the chambers, means to reciprocate one of the electrode holders in axial alinement with the opposite electrode holder, means to maintain a circulation of cooling medium within the chambers, electrodes carried at the extremities of the electrode holders, and means to make electrical connection with the electrode holders.

In testimony whereof we hereunto affix our signatures.

FRANK M. CUSHING.
WILLIAM L. B. CUSHING.